June 23, 1964 C. L. HEIZMAN 3,138,718
AMPLITUDE BISTABLE CIRCUITS
Filed Nov. 30, 1960 3 Sheets-Sheet 1

INVENTOR
CHARLES L. HEIZMAN

BY Stephen J. Limanek
ATTORNEY

June 23, 1964

C. L. HEIZMAN 3,138,718

AMPLITUDE BISTABLE CIRCUITS

Filed Nov. 30, 1960

3 Sheets-Sheet 2

United States Patent Office 3,138,718 Patented June 23, 1964

3,138,718
AMPLITUDE BISTABLE CIRCUITS

Charles L. Heizman, Peekskill, N.Y., assignor to International Business Machines Corporation, New York, N.Y., a corporation of New York Filed Nov. 30, 1960, Ser. No. 72,647
18 Claims. (Cl. 307—88)

Figure 1:
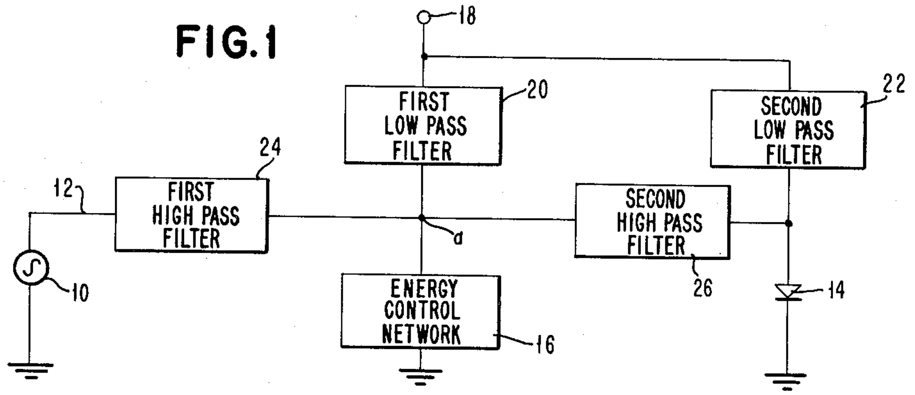

This invention relates to bistable circuits, and more particularly, to improved bistable circuits for use in high speed logical systems.

In recent years there has been described in the literature, phase locked circuits for use in logical machines operating at high speeds and having long life and great reliability. These circuits are designed to provide at least two stable phases of carrier wave energy, each stable phase representing one bit of information. To produce the multiphase circuits, non-linear capacitance, generally provided by a non-linear capacitance diode, is utilized in one form of these circuits and non-linear inductance, generally provided by a coil wound on a magnetic core, is utilized in another form of these circuits. The first form of these circuits is disclosed in U.S. Patent No. 2,815,488, granted to J. Von Neumann on December 3, 1957 and the second form of these circuits is described in British Patent 778,883, granted July 10, 1957. Circuits exhibiting the principles described in the above mentioned phase locked circuit have been generally referred to as parametric circuits, for example, parametric oscillators, parametric amplifiers, etc. A comprehensive list of articles on parametric circuits may be found in the May 1960 issue of the Proceedings of the IRE, on pages 848–853.

Parametric circuits have been found to be very useful in the design of electronic computing systems, but it also has been noted that non-linear capacitance diodes of a very high quantity are necessary to produce desirable results in the prior art multi-stable parametric circuits and that the non-linear inductance circuits, sometimes called parametrons, do not operate at high frequencies.

An object of this invention is to provide an improved high speed bistable circuit.

Another object of this invention is to provide improved high speed logical circuits which operate at microwave frequencies.

A further object of this invention is to provide a circuit useful in high speed logical systems, which is both direct current and carrier wave amplitude bistable.

Yet another object of this invention is to provide an improved amplitude bistable circuit which may be employed to produce an economical computing system operating at information rates in the order of 1 kmc.

In accordance with this invention a bistable circuit is provided which includes a high frequency voltage source coupled to means for producing a control voltage, means including a voltage dependent element for controlling the flow of energy from the source to the control voltage producing means and means for applying the voltage from the control voltage producing means to the energy controlling means.

An advantage of the circuit of this invention is that a reliable high speed amplitude bistable circuit is provided which does not require the use of an expensive high quality non-linear capacitance diode or a relatively slow acting non-linear inductor.

The foregoing and other objects, features and advantages of the invention will be apparent from the following more particular description of preferred embodiments of the invention, as illustrated in the accompanying drawings.

Figure 2:
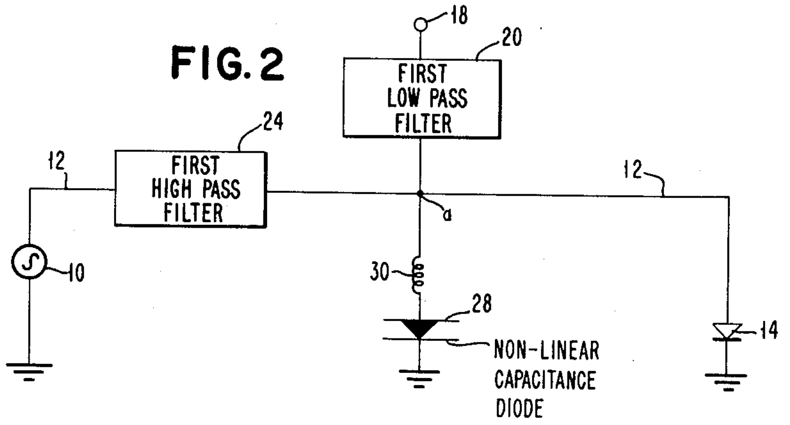
Figure 3:
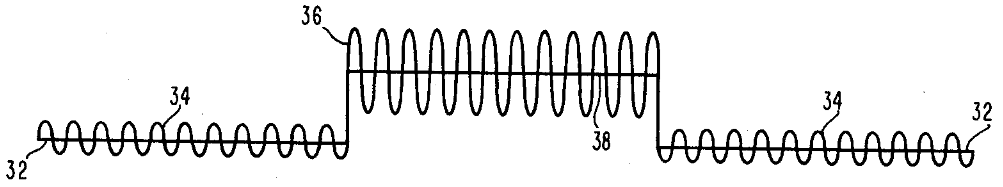
Figure 4:
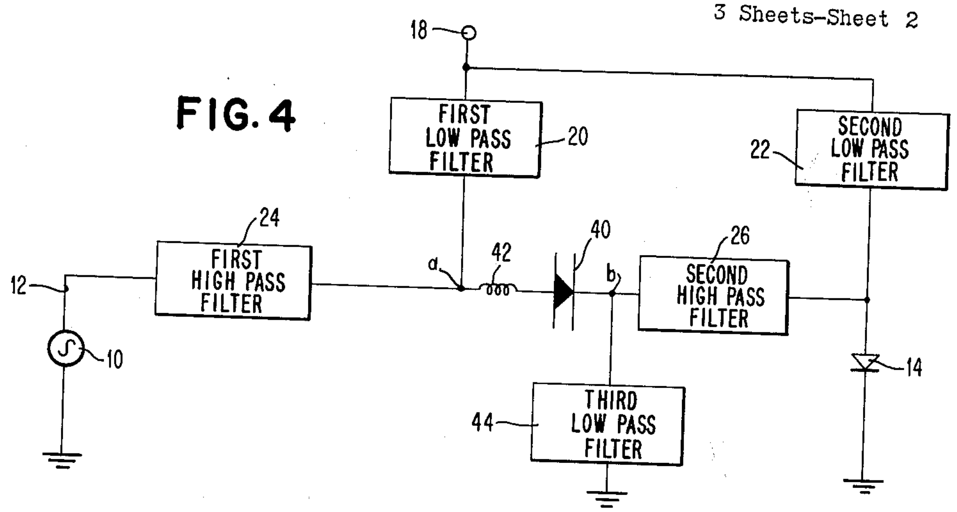
Figure 5:
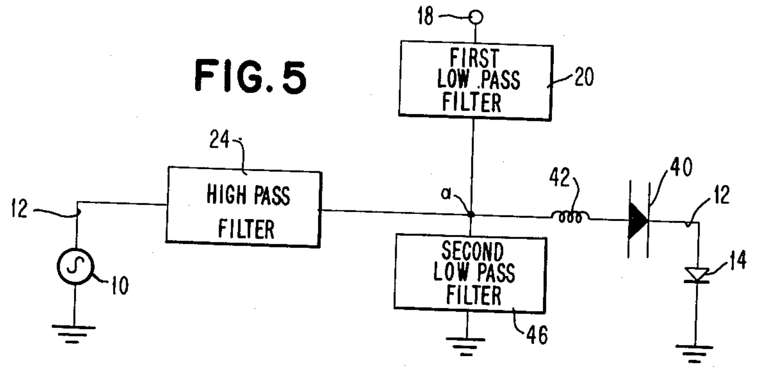
Figure 6:
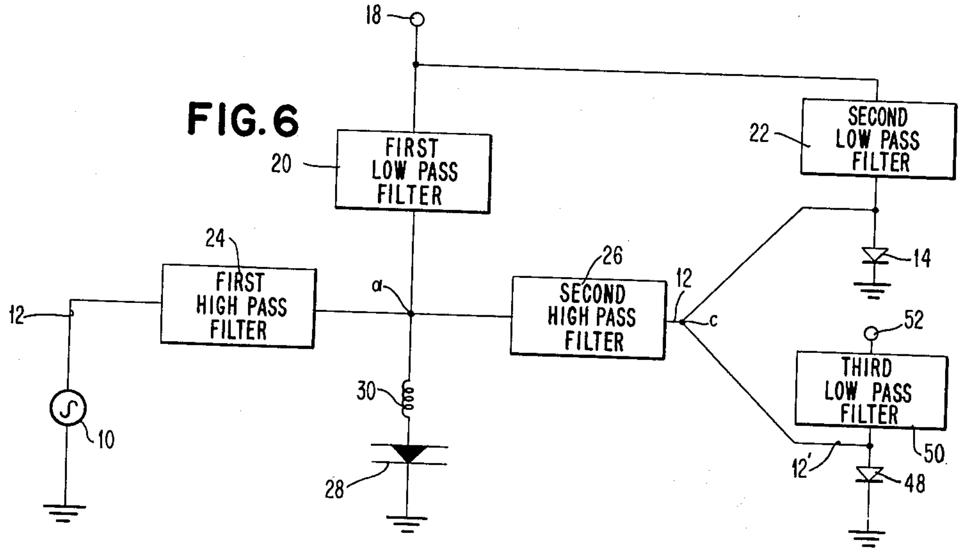
Figure 7:
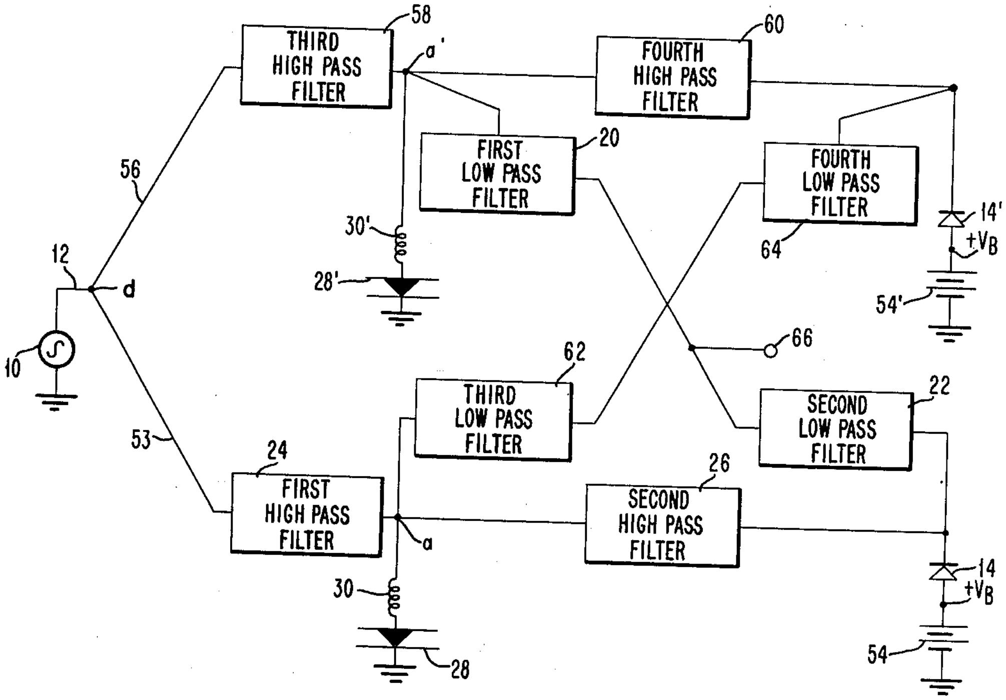
Figure 8:
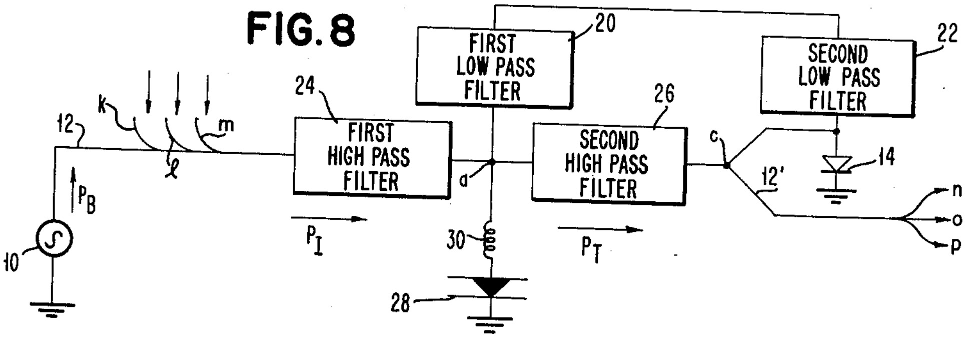
Figure 9:
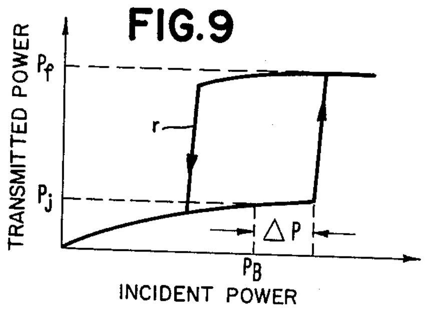
Figure 10:
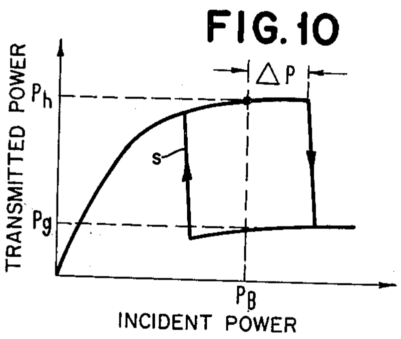

In the drawings:

FIG. 1 illustrates an embodiment of the bistable circuit of this invention wherein the voltage dependent reactance is coupled across a transmission line, FIG. 2 shows a bistable circuit similar to that illustrated in FIG. 1, but wherein a non-linear capacitance diode is used to provide a non-linear reactance and the transmission line is used in the direct current voltage feedback path to the energy controlling means, FIG. 3 is a graph showing a curve indicating the relationship between the incident power and the transmitted power in the circuits illustrated in FIGS. 1 and 2, FIG. 4 illustrates another embodiment of the bistable circuit of the invention which is similar to the circuit illustrated in FIG. 2, but wherein the energy controlling means is serially connected with the transmission line, FIG. 5 shows a circuit similar to that illustrated in FIG. 4 but wherein the transmission line is used as the direct current voltage feedback path, FIG. 6 illustrates a circuit of this invention which provides a unidirectional flow of information, FIG. 7 illustrates a balanced bistable circuit of the present invention, FIG. 8 illustrates a circuit of this invention which can be used in a logic system employing carrier wave amplitude information, and, FIGS. 9 and 10 show curves of the incident power plotted against transmitted power in the circuit illustrated in FIG. 8.

Referring to the drawings in more detail and, particularly, to FIG. 1 there is shown a bistable circuit which includes a carrier wave source or oscillator 10 coupled through a transmission line 12 to a rectifier or diode 14, an energy control network 16, which preferably includes a non-linear reactance, is coupled to the transmission line 12 at a point *a*, a direct current signal input terminal 18 is coupled through a first low pass filter 20 and point *a* of transmission line 12 to the energy control network 16. The rectifier 14 is coupled to the energy control network 16 through a second low pass filter 22, the first low pass filter 20 and point *a* of the transmission line 12. First and second high pass filters 24 and 26 are provided in the transmission line 12 to prevent direct current energy at point *a* of the transmission line 12 from flowing into the oscillator 10 and the rectifier 14, respectively. The transmission line 12 may be in the form of a waveguide, a stripline or a coaxial cable.

The circuit illustrated in FIG. 2 is similar to the circuit illustrated in FIG. 1 except that the energy control network 16 of the circuit shown in FIG. 1 has been replaced by a non-linear capacitance diode 28 serially connected to a linear inductor 30 and transmission line 12 is used as the direct current feedback path between the rectifier 14 and point *a* in the transmission line 12, thus, eliminating the need for the direct current feedback circuit through the second low pass filter.

The high pass filters in the circuits of this invention have a cut-off frequency somewhat below the frequency of the carrier wave produced by the oscillator 10 so as to readily pass the carrier wave but to prevent the direct current energy from passing therethrough and the low pass filters have a cut-off frequency somewhat below the carrier wave frequency so as to prevent the carrier wave from passing therethrough while permitting the flow of direct current energy.

The operation of the circuits illustrated in FIGS. 1 and 2 may be more clearly understood by referring to the voltage curves illustrated in FIG. 3 of the drawing. The circuit is designed so that when the carrier wave source or oscillator 10 is turned on, the impedance provided by the non-linear capacitance diode 28 and the inductor 30 as viewed from point *a* in transmission line 12 has a low value which will reflect energy and thus permit only a relatively small amount of carrier wave energy to pass through the transmission line 12 to the rectifier 14. The rectifier 14 rectifies this energy and it is fed back, through the second low pass filter 22 in the circuit shown in FIG. 1 or through transmission line 12 in the circuit shown in FIG. 2, to the non-linear capacitance diode 28. Since the rectified voltage is of a relatively low value the capacitance of the diode will be substantially unaffected by by this voltage which is indicated by line 32 in FIG. 3 and the amplitude of the carrier wave transmitted through point *a* in the transmission line 12 is indicated by wave 34. When a direct current signal or voltage is applied to terminal 18, the capacitance of the voltage dependent non-linear capacitance diode 28 varies so as to increase the impedance at point *a* in transmission line 12 when looking into the non-linear capacitance diode 28 from point *a*. This increased impedance at point *a* increases the amount of carrier wave energy from oscillator 10 passing through the transmission line 12 to the rectifier 14 as indicated by waves 36 in FIG. 3, which now produces a larger direct current voltage, as indicated by line 38 in FIG. 3 of the drawing. The larger direct current voltage will maintain the capacitance of the non-linear capacitance diode 28 at a value which will appear from point *a* of transmission line 12 as a high impedance. In order to decrease the voltages to the original values, a direct current input signal may be applied to the terminal 18 so as to restore the original voltage across the non-linear capacitance diode 28, thus, to reduce the impedance at point *a* of the transmission line 12. It can be seen that the circuits illustrated in FIGS. 1 and 2 have two amplitude stable states, both direct and alternating current. In one stable state the inductor 30 and the capacitance of diode 28 are preferably at series resonance and in the other stable state they are non-resonant. The switching speed of the circuits illustrated in FIGS. 1 and 2 is very fast, of the order of one nanosecond or millimicrosecond when the carrier frequency is 10 kilomegacycles.

It should be understood that the linear inductor 30 may be connected in parallel with the non-linear capacitance diode 28, if desired, and the circuit will operate in substantially the same manner as described hereinabove to produce the same results.

Another embodiment of the circuit of this invention is illustrated in the FIG. 4 wherein a non-linear capacitance diode 40 and a linear inductor 42 are serially connected in the transmission line 12 between the carrier wave oscillator 10 and the rectifier 14. The circuit illustrated in FIG. 4 includes a third low pass filter 44 connected to the transmission line 12 at point *b* so as to complete the direct current circuit from rectifier 14 through diode 40. The series connected non-linear capacitance diode 40 controls the flow of energy from oscillator 10 to rectifier 14 in accordance with the bias voltage applied thereto from rectifier 14 in a manner similar to that described in connection with the operation of the circuits shown in FIGS. 1 and 2.

FIG. 5 illustrates a circuit which is somewhat similar in structure and operation to that shown in FIG. 4 but differs therefrom in that the direct current feedback circuit from the rectifier 14 to the non-linear capacitance diode 40 utilizes the transmission line 12 and a low pass filter 46 coupled to point *a* of the transmission line 12.

FIG. 6 illustrates a circuit similar to that shown in FIG. 1 of the drawings except that the energy control network 16 of FIG. 1 is shown as the serially connected non-linear capacitance diode 28 and inductor 30 illustrated in FIG. 2, and an output circuit is coupled to the transmission line 12 at a point *c* intermediate the rectifier 14 and the second high pass filter 26. A conventional high frequency power divider may be used at point *c* to direct the carrier wave energy into two paths, one leading to the rectifier 14 and the other leading into the output circuit. The output circuit includes a second rectifier 48 and a third low pass filter 50 coupling the second rectifier 48 to an output terminal 52. A transmission line 12′ couples the common point between the second rectifier 48 and the third low pass filter 50 to point *c* in transmission line 12.

In the operation of the circuit illustrated in FIG. 6, the carrier wave energy transmitted through point *a* of the transmission line 12 is divided at point *c* in transmission line 12 so that a portion of the energy entering into point *c* is applied to the first rectifier 14, rectified and fed back to the non-linear capacitance diode 28 through the first and second low pass filters 20 and 22 and the linear inductor 30. The remaining portion of the energy entering into point *c* of transmission line 12 passes through transmission line 12′ to the second rectifier 48 where it is rectified and applied to the output terminal 52 through the third low pass filter 50. It can be readily seen that in this embodiment of the invention the output terminal 52 will be isolated from the input terminal 18, thus providing a unidirectional flow of information through this circuit.

FIG. 7 shows a balanced bistable circuit employing the principles of this invention. This circuit includes the carrier wave source or oscillator 10, the first transmission line 12, second and third transmission lines 53 and 56, each connected at one end to the first transmission line 12 at a junction point *d*, the other end of each of the second and third transmission lines 53 and 56 being connected to a first terminal of first and second rectifiers 14 and 14′, respectively. Direct current voltage sources 54 and 54′ each providing a terminal voltage $+V_B$ are connected to the other terminal of the rectifiers 14 and 14′, respectively, for applying a forward bias thereto. First and second high pass filters 24 and 26 are disposed in the second transmission line 53 and third and fourth high pass filters 58 and 60 are disposed in the third transmission line 56. The non-linear capacitance diode 28 serially connected to the inductor 30 is coupled to the second transmission line 53 at point *a* between the first and second high pass filters 24 and 26 and a non-linear capacitance diode 28′ serially connected to an inductor 30′ is coupled to the second transmission line 56 at point *a′* between the third and fourth high pass filters 58 and 60. The first terminal of the first rectifier 14 is coupled to the non-linear capacitance diode 28′ through the series circuit including first and second low pass filters 20 and 22, point *a′* in transmission line 56 and the inductor 30′. The first terminal of the second rectifier 14′ is coupled to the non-linear capacitance diode 28 through third and fourth low pass filters 62 and 64, point *a* in transmission line 53 and the inductor 30. Direct current input terminals, such as input terminal 66, may be connected to the common point between the first and second low pass filters 20 and 22 or to the common point between the third and fourth low pass filters 62 and 64. When a direct current input terminal is not connected to the common point of two of the low pass filters, one of the two low pass filters may be eliminated if this will not appreciably increase carrier wave losses. It can be seen that in the operation of the circuit shown in FIG. 7, the voltage developed across the first rectifier 14 controls the capacitance value of the non-linear capacitance diode 28′ and the voltage developed across the second rectifier 14′ controls the capacitance value of the non-linear capacitance diode 28. In the balanced version of the circuit of the present invention illustrated in FIG. 7, in one stable state of the circuit a high current passes through one of the two non-linear capacitance diodes 28, 28′ and a relatively low current flows through the other of the two diodes, and in the second stable state, the opposite current relationship prevails in the two diodes 28, 28′. Due to the symmetry of this circuit either one of the two non-linear capacitance diodes may carry the high current when the carrier wave energy from oscillator 10 is turned on. Accordingly, the circuit shown in FIG. 7 provides a very high gain since only a very small input signal or voltage determines the states of the two diodes 28, 28.

Heretofore in the description of the present invention, direct current input signals or voltages have been mentioned for switching the circuits from one stable state to the other stable state. However, it should be understood that the circuit may be modified so as to utilize carrier wave input signals to switch the circuit from one stable state to the other. In the bistable circuits employing carrier wave inputs, the transmitted or output power is a bistable function of the incident power. The circuit illustrated in FIG. 8 shows an embodiment of this invention wherein carrier wave input lines *k*, *l* and *m* are connected to the transmission line 12 of the circuit and carrier wave output signals are produced at terminals *n*, *o* and *p*. It can be seen that this circuit is somewhat similar to the circuit illustrated in FIG. 6 of the drawing except that the output energy passing through transmission line 12' is not rectified but is divided into three separate channels to terminals *n*, *o* and *p*.

In the operation of the circuit shown in FIG. 8, the circuit is turned on and off by means (not shown) which modulate the carrier wave energy produced by the oscillator 10 in a manner similar to that described in detail in the above-mentioned U.S. Patent 2,815,488 and British Patent 778,883. Thus, the carrier wave may be square wave modulated, and the incident power applied periodically to point *a* in transmission line 12 of the circuit is the bias power $P_B$ when no energy is passing through the input lines *k*, *l* and *m*. As shown in FIG. 9, when the incident power is equal to $P_B$ the transmitted power through transmission line 12' is equal to a relatively low value $P_j$, at which value the circuit is operating in one of its two stable states and the non-linear capacitance diode 28 and the inductor 30 are resonant at the frequency of the carrier wave. After an additional amount of energy $\Delta P$ is applied to point *a* of transmission line 12, e.g. through input lines *k*, *l* or *m*, the capacitance of the non-linear capacitance diode 28 will materially vary, the serially connected diode 28 and inductor 30 will become non-resonant and the transmitted energy through transmission line 12' will suddenly increase to a value at least equal to $P_f$, which is the output power transmitted when the circuit is in its other stable state. When the carrier wave energy from the oscillator 10 is turned off and no carrier wave input signals are being applied to the circuit through lines *k*, *l* and *m*, the transmitted power will return to zero in the manner indicated by the graph of FIG. 9 along the line *r*, the circuit exhibiting a hysteresis effect. It should be understood that the threshold energy $\Delta P$ required to shift the circuit from one stable state to the other stable state may be varied by changing the value of the output voltage $P_B$ from oscillator 10. It also should be understood that many logical functions can be performed by the circuit illustrated in FIG. 8, such as, the OR function, the AND function or the majority function. If the value of the bias power $P_B$ and the strength of one signal applied to the transmission line 12 through one of the input lines *k*, *l* or *m* is sufficient to switch the circuit illustrated in FIG. 8 from one state to the other state, the circuit will operate as an OR circuit. If at least two of the three input signals are required to switch the circuit from one stable state to the other stable state, the circuit of FIG. 8 will operate as a majority circuit and, if signals must be present in all three input lines *k*, *l* and *m* to switch the circuit from one stable state to the other stable state, the circuit of FIG. 8 will operate as an AND circuit. The circuit of this invention may be used as a storage loop by storing information in the carrier wave transmission line, e.g. in a waveguide, between point *a* thereof and the rectifier 14. The loop is completed through the direct current feedback path between rectifier 14 and point *a*.

The circuit illustrated in FIG. 8 may also be used to accomplish the inversion function. More specifically, the circuit parameters may be adjusted so that the transmitted power is at a relatively high value $P_h$ when the oscillator

10 is turned on to produce the bias power $P_B$ and no carrier wave output signals are passing through the input lines *k*, *l* and *m*, as indicated in FIG. 10 of the drawing. After an additionel amount of energy $\Delta P$ is applied to point *a* of the transmission line 12, e.g. through the carrier wave input lines *k*, *l* and *m*, the circuit will be switched to its other stable state producing a low output power of approximately $P_g$, as indicated in FIG. 10 of the drawing. In order to operate the circuit shown in FIG. 8 as an inversion circuit, it is only necessary to, e.g., place the inductor 30 and the non-linear capacitance diode 28 in a transmission line stub having an effective length such that the stub line appears to point *a* of transmission line 12 as a high impedance when the series circuit including diode 28 and inductor 30 is resonant at the frequency of the carier wave from oscillator 10 and as a low impedance when the series circuit 28, 30 is substantially non-resonant at this frequency. When the oscillator 10 is turned off, the transmitted power will return to zero in the manner indicated by the graph of FIG. 10 along the line *s*, the circuit exhibiting a hysteresis effect. Thus, it can be seen that the circuit of FIG. 8 can be designed so that a relatively large input signal will cause a small signal to be produced at the output of this circuit to accomplish the inversion function.

It should be understood that circuit shown in FIG. 8 may be modified to perform logical functions when direct current signals are used to represent bits of binary information by replacing the carrier wave input lines *k*, *l* and *m* with direct current input circuits. These direct current input circuits may be of the type described in my application Serial No. 72,646, entitled Amplitude Bistable Circuits, filed on even date, which include a non-linear capacitance diode coupled to the carrier wave transmission line so as to reflect carrier wave energy back to its source in amounts dependent upon the direct current voltage applied thereto.

It should also be understood that when an output terminal of any of the circuits of this invention is not isolated from the input terminal, information may be made to flow in one direction by applying pulses of carrier wave energy to successive stages of these circuits at 120° intervals of a cycle of operation in the manner disclosed in the hereinabove mentioned Von Neumann and British patents.

Detailed connections between the elements, such as the diodes, and the transmission line of the circuit of this invention have not been described or illustrated since these connections are well known in the art. For these details reference may be had to copending applications of the common assignee filed by K. E. Schreiner and B. L. Havens on February 14, 1958, having Serial No. 715,353, now Patent No. 2,987,253, K. E. Schreiner on June 6, 1958, having Serial No. 742,803, now Patent No. 2,987,-630, and H. P. Wolff on May 29, 1959 having Serial No. 816,884, now Patent No. 3,069,629, to U.S. Patent No. 2,914,249 and to Sanders Associates' Handbook of Tri-Plate Microwave Components, 1956 edition.

Accordingly, it can be seen that a simple and economical high speed bistable circuit has been provided which may be utilized in computing systems operating at information rates in the order of 1 kmc and which can perform a variety of logical functions utilizing either carrier wave or direct current amplitude levels to represent bits of binary information.

While the invention has been particularly shown and described with reference to preferred embodiments thereof, it will be understood by those skilled in the art that various changes in form and details may be made therein without departing from the spirit and scope of the invention.

What is claimed is:

1. A bistable circuit comprising a source of carrier wave energy, means for producing a control voltage, a transmission line coupling said source to said control voltage producing means, means including a voltage dependent element for controlling the flow of said energy from said source to said control voltage producing means, means for applying the control voltage from said control voltage producing means to said energy controlling means and means for applying a signal to said energy controlling means for switching the circuit from one stable state to another stable state.

2. A bistable circuit comprising a source of carrier wave energy, a rectifier means, a transmission line coupling said source to said rectifier means, means including a voltage dependent element for controlling the flow of said energy from said source to said rectifier means, means for applying an output voltage from said rectifier means to said energy controlling means and means for applying a signal to said energy controlling means for switching the circuit from one stable state to another stable state.

3. A bistable circuit as set forth in claim 1 wherein said voltage dependent element is a non-linear capacitance.

4. A bistable circuit as set forth in claim 1 wherein said energy controlling means includes a non-linear capacitance diode and inductor coupled thereto.

5. A bistable circuit as set forth in claim 4 wherein said nonlinear capacitance diode and said inductor are serially interconnected.

6. A bistable circuit as set forth in claim 2 wherein said output voltage applying means comprises a direct current feedback circuit including a low pass filter.

7. A bistable circuit as set forth in claim 1 wherein said energy controlling means is coupled across said transmission line.

8. A circuit having two stable states comprising a source of carrier wave energy, a rectifier, a transmission line coupling said source to said rectifier, means including a voltage dependent reactance coupled to said transmission line at a point intermediate the ends thereof for controlling the flow of said energy from said source to said rectifier, a first high pass filter disposed in said transmission line between said source and said energy controlling means, a second high pass filter disposed in said transmission line between said energy controlling means and said rectifier, a direct current feedback circuit coupling the output of said rectifier to said energy controlling means, said feedback circuit including at least one low pass filter, and means for applying a direct current input signal to said energy controlling means.

9. A circuit having two stable states comprising a source of carrier wave energy, a rectifier, a transmission line coupling said source to said rectifier, means including a non-linear capacitance diode and an inductor serially connected therewith coupled to said transmission line at a point intermediate the ends thereof for controlling the flow of said energy from said source to said rectifier, means for applying the output voltage from said rectifier to said non-linear capacitance diode and means including a low pass filter for applying a direct current signal to said non-linear capacitance diode for switching the circuit from one stable state to the other stable state.

10. A bistable circuit as set forth in claim 1 wherein said energy controlling means is coupled serially with said transmission line.

11. A circuit having two stable states comprising a source of carrier wave energy, a rectifier, a transmission line coupling said source to said rectifier, means including a non-linear capacitance diode and an inductor serially connected therewith disposed within said transmission line and serially coupled with said line for controlling the flow of said energy from said source to said rectifier, a first high pass filter disposed in said transmission line between said source and said energy controlling means, a second high pass filter disposed in said transmission line between said energy controlling means and said rectifier, a direct carrier feedback circuit coupling the output of said rectifier to said non-linear capacitance diode, said feedback circuit including a first filter connected between said rectifier and one terminal of said energy controlling means and a second filter connected between the other terminal of said energy controlling means and a point of ground potential and a direct current input circuit coupled to said nonlinear capacitance diode for switching said circuit from one stable state to the other stable state.

12. A circuit having two stable states comprising a source of carrier wave energy, a rectifier, a transmission line coupling said source to said rectifier, means comprising a combination including a non-linear capacitance diode and an inductor disposed in said transmission line intermediate the ends thereof and coupled serially therewith for controlling the flow of said energy from said source to said rectifier, a high pass filter disposed in said transmission line between said source and said energy controlling means, a direct current feedback circuit including a first low pass filter for applying the output from said rectifier to said non-linear capacitance diode and a direct current signal input circuit including a second low pass filter coupled to said non-linear capacitance diode.

13. A bistable circuit comprising a source of carrier wave energy, means for producing a control voltage, a transmission line coupling said source to said control voltage producing means, means including a voltage dependent element coupled to said transmission line at a point intermediate the ends thereof for controlling the flow of said energy from said source to said rectifier, means for applying the output voltage from said control voltage producing means to said energy controlling means and an output circuit coupled to said transmission line between said energy controlling means and said control voltage producing means.

14. A bistable circuit as set forth in claim 13 wherein said means for producing a control voltage includes a rectifier.

15. A bistable circuit as set forth in claim 14 wherein said output circuit includes a second rectifier coupled to said transmission line, an output terminal and a low pass filter coupling the output of said rectifier to said terminal and wherein said bistable circuit further includes a direct current input terminal coupled to said energy controlling means.

16. A bistable circuit as set forth in claim 13 wherein said output circuit includes a plurality of carrier wave transmission lines and wherein said bistable circuit further includes means for applying carrier wave signals to said energy controlling means.

17. A circuit having two stable states comprising a source of carrier wave energy, a first transmission line connected at one end to said source, second and third transmission lines each connected at one end to the other end of said first transmission line, first and second rectifiers coupled to the other end of said second and third transmission lines, respectively, first and second means including a non-linear capacitance diode and an inductor coupled to said second and third transmission lines, respectively, at a point intermediate the ends thereof for controlling the flow of energy from said source through its associated transmission line, means for applying the output voltage from said first rectifier to said second diode and means for applying the output voltage from said second rectifier to said first diode.

18. A bistable circuit comprising a source of carrier wave energy, a first transmission line connected at one end to said source, second and third transmission lines each coupled at one end to the other end of said first transmission line, first and second rectifiers coupled to the other end of said second and third transmission lines, respectively, first and second means including a non-linear capacitance diode and an inductor coupled to said second and third transmission lines, respectively, at a point intermediate the ends thereof for controlling the flow of energy through the transmission line associated therewith, first and second high pass filters disposed in said second and third transmission lines, respectively, between said first line and said energy controlling means, second and third high pass filters disposed in said second and third transmission lines, respectively, between said energy controlling means and said rectifier, a first direct current circuit including a low pass filter coupling the output of said first rectifier to the non-linear capacitance diode of said second energy controlling means, a second direct current circuit including a low pass filter coupling the output of said second rectifier to the nonlinear capacitance diode of said first energy controlling means and means for applying a direct current input signal to the non-linear capacitance diode of one of said first and second energy controlling means.

References Cited in the file of this patent

UNITED STATES PATENTS

| | | |
|---|---|---|
| 2,728,858 | Ziffer | Dec. 27, 1955 |
| 2,937,341 | Aram | May 17, 1960 |
| 2,992,398 | Sterzer | July 11, 1961 |
| 3,084,335 | Kosonocky | Apr. 2, 1963 |

UNITED STATES PATENT OFFICE

CERTIFICATE OF CORRECTION

Patent No. 3,138,718 June 23, 1964

Charles L. Heizman

It is hereby certified that error appears in the above numbered patent requiring correction and that the said Letters Patent should read as corrected below.

Column 5, line 1, for "28, 28" read -- 28, 28′ --; column 6, line 2, for "wave output" read -- wave input --.

Signed and sealed this 12th day of January 1965.

(SEAL)
Attest:

ERNEST W. SWIDER
Attesting Officer

EDWARD J. BRENNER
Commissioner of Patents